United States Patent
Morikaku et al.

(10) Patent No.: US 8,595,915 B2
(45) Date of Patent: Dec. 3, 2013

(54) STATOR OF ELECTRIC ROTATING MACHINE

(75) Inventors: Hideki Morikaku, Tokyo (JP);
Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1623 days.

(21) Appl. No.: 11/226,278

(22) Filed: Sep. 15, 2005

(65) Prior Publication Data

US 2006/0032041 A1    Feb. 16, 2006

Related U.S. Application Data

(63) Continuation of application No. 10/749,382, filed on Jan. 2, 2004, now abandoned.

(51) Int. Cl.
*H01S 4/00* (2006.01)
*H02K 15/00* (2006.01)

(52) U.S. Cl.
USPC .......................... 29/592.1; 29/596

(58) Field of Classification Search
USPC ................................. 29/592.1, 596
See application file for complete search history.

(56) References Cited

U.S. PATENT DOCUMENTS

| | | | |
|---|---|---|---|
| 3,130,335 A * | 4/1964 | Rejda | 310/215 |
| 3,157,939 A | 11/1964 | Balke et al. | |
| 3,464,106 A | 9/1969 | Barret et al. | |
| 6,658,721 B2 * | 12/2003 | Kazama et al. | 29/596 |
| 6,674,211 B2 * | 1/2004 | Katou et al. | 310/215 |
| 6,774,511 B2 * | 8/2004 | Chochoy et al. | 310/43 |

FOREIGN PATENT DOCUMENTS

| | | |
|---|---|---|
| DE | 2115336 | 10/1972 |
| EP | 0 609 033 A1 | 8/1994 |
| EP | 0 772 275 A | 5/1997 |
| EP | 0772275 * | 5/1997 |
| EP | 0 961 386 A1 | 12/1999 |
| EP | 1 178 587 A | 2/2002 |
| GB | 788520 A | 1/1958 |
| JP | 36-22904 | 9/1961 |
| JP | 55-141947 | 4/1979 |
| JP | 57-20134 | 2/1982 |
| JP | 62-7748 | 1/1987 |
| JP | 64-060240 | 3/1989 |
| JP | 9-23601 | 1/1997 |

(Continued)

OTHER PUBLICATIONS

Much, W. et al., "Wicklungen und Montage rotierender elektrischer Maschinen" [winding and assembly of electric rotating machines], VEB Verlag Technik, Berlin, 1978, p. 113.

*Primary Examiner* — David Angwin
(74) *Attorney, Agent, or Firm* — Sughrue Mion, PLLC

(57) ABSTRACT

A stator of an electric rotating machine is improved in efficiency of inserting a winding assembly into slots and insulation performance after the insertion. The stator 8 acting as an armature includes an insulator 4 of a two-layer structure in which paper 9 is disposed on the stator winding side and resin 10 on the stator core side or a two-layer structure in which the paper and resin are disposed in a opposite manner, a stator core 2 in which plural slots 2a each extending in vertical axial direction are provided in circumferential direction, and a stator winding 3 wound round the stator core 2. The insulator 4 electrically insulates the stator core 2 and the stator winding 3.

6 Claims, 10 Drawing Sheets

(56) References Cited

FOREIGN PATENT DOCUMENTS

| JP | 2000-308314 | | 11/2000 |
|---|---|---|---|
| JP | 2000-308314 A | | 11/2000 |
| JP | 11106914 | * | 11/2000 |
| WO | WO 94/02986 | * | 2/1994 |
| WO | WO 94/02986 A1 | | 3/1994 |
| WO | WO 01/93406 | | 6/2001 |
| WO | WO 01/93406 | * | 12/2001 |

* cited by examiner (a)      (b)

(a)      (b)

(a)　　　　　　　　　　　(b)

STATOR OF ELECTRIC ROTATING MACHINE

This is a continuation of application Ser. No. 10/749,382 filed Jan. 2, 2004 now abandoned. The entire disclosure of the prior application, application Ser. No. 10/749,382 is hereby incorporated by reference.

BACKGROUND OF THE INVENTION

1. Field of the Invention

The present invention relates to a method of forming a stator of an electric rotating machine driven by an internal combustion engine of a vehicle.

2. Description of the Related Art

FIG. 10 is a perspective view showing a conventional stator of an electric rotating machine for vehicle.

In the drawing, a stator 1 includes a stator core 2, a stator winding 3, and an insulator 4. The stator core 2 is cylindrical in shape and is provided with plural long slots 2a at predetermined pitch along the circumferential direction of the stator core 2 in axial direction. The stator winding 3 is wound around the stator core 2, and the insulator 4 is formed into a U-shape to electrically insulate the foregoing stator core 2 and the stator winding 3 from each other.

The stator winding 3 is comprised of one set of three-phase alternating current winding, and a large number of, for example, thirty-six slots 2a are formed for accommodating the stator winding 3.

Manufacturing process of the foregoing conventional stator 1 is now described with reference to FIGS. 11 to 17.

First, a predetermined number of thin strip plates of an SPCC material, which is a magnetic material, are prepared. These plural thin strip plates are then laminated, and outer circumferential portions thereof are welded by laser welding, thus a laminated core 5 formed into a rectangular parallelepiped shown in FIG. 11 being obtained.

A large number of slots 2a are formed on one side in longitudinal direction of the laminated core 5. In the drawing, numeral 5a is a tooth, and numeral 5b is a flange.

A strand 6 composed of a copper wire material that is circular in section and is applied with an insulating coating is wound by a predetermined number of turn of winding in the shape of wave winding at three slot pitch, thus a winding assembly 7A of flat configuration as a whole being prepared. A beginning end and a terminal end of winding the strand 6 forming this winding assembly 7A are used as a lead strand 6a and a neutral point lead strand 6b respectively. Winding another strand 6 additionally forms each of winding assemblies 7B and 7C.

Next, as shown in FIG. 12, the insulator 4 formed into substantially a U-shape is fitted in each slot 2a of the laminated core 5 from the opening side of the slot 2a and is fully accommodated in the slot 2a. The three winding assemblies 7A, 7B and 7C overlap each other staggering by one slot pitch between them as shown in FIG. 13.

The winding assemblies 7A, 7B, and 7C overlapping each other as described above are inserted in the slots 2a every third slot from the opening side of the slots 2a respectively. The winding assemblies 7A, 7B, and 7C are thus mounted on the laminated core 5 as shown in FIG. 15 and FIG. 16.

Subsequently, the foregoing laminated core 5 mounted with the winding assemblies 7A, 7B, and 7C is bent into a cylindrical shape by a forming machine as shown in FIG. 17, and thereafter both end faces of the laminated core 5 are welded together by butt welding, thus a complete stator 1 as shown in FIG. 1 being obtained.

In the conventional stator 1 constructed as described above, the stator winding 3, which is a three-phase alternating-current winding, is obtained by connecting the neutral point lead strands 6b of the strands 6 forming the winding assemblies 7A, 7B, and 7C. Each of these winding assemblies 7A, 7B, and 7C has a phase difference of 120°, corresponding to windings of a-phase, b-phase, and c-phase of the three-phase alternating-current winding respectively.

At the time of mounting this stator 1 on an alternating-current generator for vehicle, the lead strands 6a of the strands 6 forming the winding assemblies 7A, 7B, and 7C are connected to a rectifier.

The conventional stator is constructed as described above, and in the manufacturing process thereof, the winding assemblies 7A, 7B and 7C are inserted from the slot opening side into the insulator 4 after completely inserting the substantially U-shaped insulator 4 in the slot 2a of the laminated core 5.

In the alternating-current generator for vehicle, a very small space is left between the stator 1 and a rotor (not shown), and the insulator 4 interferes with the rotor if the insulator 4 protrudes out of the slot 2a. Therefore, the insulator 4 is formed so that end thereof does not protrude from the opening of the slot toward the inner diameter.

In other words, end of the insulator 4 and end face of a tooth 5b are on the same plane. When inserting the winding assemblies 7A, 7B, and 7C, the end portion of the opening of the insulator 4 does not function as a guide. Hence a problem exists in that it is difficult to insert the winding assemblies making the insertion rather troublesome.

Further, since both sides of the insulator 4 are substantially in parallel, opening side of the slot 4 (2a?) is fully left open under the condition that the winding assemblies 7A, 7B, and 7C are inserted in the slots 2a. Therefore, a further problem exists in that there is a possibility that the strands 6 get out of the slots 2a at the process of bending the laminated core 5, which eventually gives a bad influence on the bending work of the core.

Moreover, due to friction force between the winding assemblies 7A, 7B and 7C and the insulator 4, the end of the insulator 4 is pushed toward the bottom of the slot 2a as the winding assemblies 7A, 7B, and 7C are inserted. As a result, the end face in circumferential direction of the tooth 5b is exposed.

As a result, the end face of the flange 5b rub the wires of the winding assemblies 7A, 7B and 7C, hence a further problem exists in that insulating coating is damaged, moreover, after insertion of the assemblies, there arises any portion where no insulator 4 interposes between the inner wall faces on the opening side of the slots 2a and the strands, which invites deterioration in insulation performance.

The Japanese Patent Publication (unexamined) No. 2000-308314 proposed an attempt for the purpose of improving the insulation performance at the opening portions of the slots described above. Specifically, this Japanese Patent Publication (unexamined) No. 2000-308314 discloses a technique in which a sheet-like insulating member is formed into a tube and inserted in a slot, one end portion of the insulating member is widened, and then a winding assembly is inserted. In this proposed technique, however, several problems exists in that insertion of the sheet-like insulating member and the widening process are troublesome, work efficiency is low, and the work does not go on smoothly.

SUMMARY OF THE INVENTION

The present invention was made to solve the above-discussed problems and has an object of obtaining a stator of an electric rotating machine that includes the following features. This insulator according to the invention is formed into a two-layer structure composed of paper and resin so that a required configuration is kept due to natural warping, i.e., self-deformation, without artificial operation. After fitting a lower portion of the insulator into a slot, a winding assembly is inserted utilizing an upper portion of the insulator as a guide in order to protect the winding assembly and improve efficiency in inserting the winding assembly. Furthermore, under the condition that the insulator is fully inserted in the slot, the insulator is deformed to close the opening in such a manner that front end of one end edge portion of the insulator comes in close contact with an inner face of the other end edge portion, thereby preventing the strand from getting out of the opening and keep the insulation performance.

According to the invention, a stator of an electric rotating machine includes a stator core in which plural slots each extending in vertical axial direction are provided in circumferential direction, a stator winding inserted in the mentioned slots and wound round the mentioned stator core, and an insulator fitted in the mentioned slots and insulate the mentioned stator core and stator winding. In this stator, the mentioned insulator is formed into a two-layer structure composed of paper and resin.

As a result, it is possible to provide a stator at a reasonable cost, and the insulator itself becomes small in thickness, and therefore space factor of the winding is improved and, furthermore, output efficiency and cooling efficiency are improved.

In the stator of an electric rotating machine according to the invention, the insulator is formed into a two-layer structure disposing the paper on the stator winding side and the resin on the stator core side.

As a result, expansion of the paper due to absorption of water is larger than that of the resin, and due to difference in expansion coefficient between the paper and resin, the insulator warps toward the stator winding particularly at a region from middle to upper portion, thus enlarging the opening portion. Consequently, most of the slots fit well, and the winding is appropriately guided at the upper curvature portion making the insertion work smooth.

In addition, after forming the insulator, the warping due to water absorption, i.e., deformation takes place naturally and the required configuration is kept without any further artificial process.

The opening of the insulator reduces as the insertion of the winding goes on, and under the condition of having completed the insertion, the flat edge portions forming the opening portion are completely closed, which prevents foreign matter and water entering into the insulator and improves insulation performance.

In the stator of an electric rotating machine according to the invention, the mentioned insulator is formed into a two-layer structure disposing the paper on the stator core side and the resin on the stator winding side.

As a result, the winding is inserted smoothly, and efficiency in insertion work of the winding is improved.

Furthermore, the insulator warps toward the winding, the opening portion is accurately closed after completing the insertion of the winding, which prevents foreign matter and water entering into the insulator and improves insulation performance.

In the stator of an electric rotating machine according to the invention, the mentioned insulator warps due to difference in expansion coefficient of water absorption after formation of the insulator, thus forming a curved surface gently enlarging toward the end.

As a result, the winding is guided smoothly and, furthermore, the opening of the insulator accurately reduces as the winding is inserted, and the opening portion is completely closed.

In the stator of an electric rotating machine according to the invention, both end edge portions of the opening portion of the foregoing insulator are provided with inclined flat edge portions extending upward from curvature portions of which inwardly curving angles are different.

As a result, under the condition of having completed the insertion of the winding, one flat edge portion and the other flat edge portion do not butt but accurately overlap each other, and consequently the opening portion is kept tightly closed.

In the stator of an electric rotating machine according to the invention, under the condition that a winding assembly is inserted in the slot through the mentioned insulator, end of one flat edge portion of the insulator is tightly in contact with an inner face of the other flat edge portion to close the opening.

As a result, it becomes possible to securely close the opening due to mutual joining force and excellent insulation performance is assured.

In the stator of an electric rotating machine according to the invention, the stator winding inserted in the slots of the stator core through the foregoing insulator is wound forming a row in depth direction.

As a result, the insulator and the slots are formed so as to cover all the coils, thus assuring high insulation performance. Consequently, sufficient insulation performance for a generator as well as high thermal conductivity (from the winding to the iron core) is achieved in this two-layer structure insulator.

In the stator of an electric rotating machine according to the invention, the stator winding inserted in the slots of the stator core through the insulator is composed of conductor segments to be inserted in axial direction of the iron core.

As a result, the same advantages as those in the foregoing claims 1 to 3 and claim 6 are achieved.

In the stator of an electric rotating machine according to the invention, the stator winding inserted in the slots of the stator core through the foregoing insulator is disposed in the form of a regular winding continuous wire.

As a result, it is easy to increase number of turns of the armature winding, and the same advantages as those described above are achieved.

DESCRIPTION OF THE PREFERRED EMBODIMENTS

Several embodiments according to the present invention are hereinafter described with reference to the attached drawings.

Embodiment 1

Figure 1:
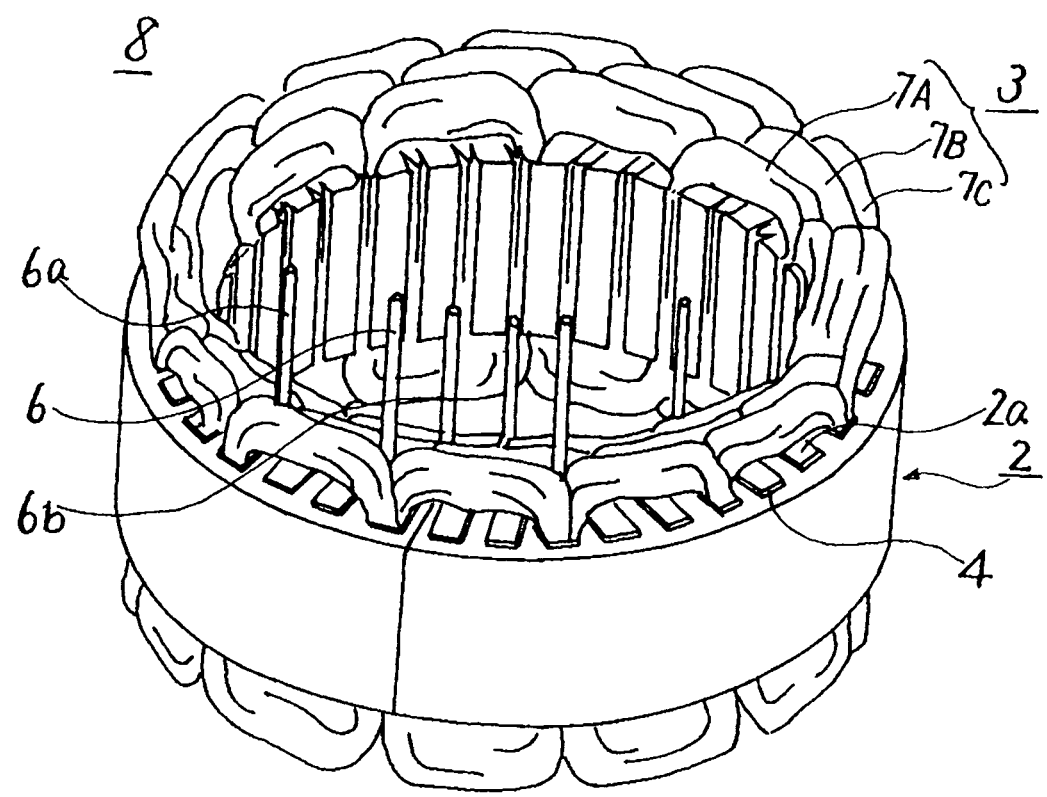
FIG. 1 is a perspective view showing a stator of an electric rotating machine according to Embodiment 1 of the invention.

FIG. 1 is a perspective view showing a stator of an electric rotating machine according to Embodiment 1 of the invention. FIGS. 2(a) and (b) are sectional views each showing an insulator in the stator of an electric rotating machine according to Embodiment 1 of the invention, and in which (a) shows a configuration under the condition that the insulator has been formed, and (b) shows a configuration under the condition that the insulator has been warped and deformed.

FIGS. 3(a) and (b) are sectional views each showing a modification of the insulator, and in which (a) shows a configuration under the condition that the insulator has been formed, and (b) shows a configuration under the condition that the insulator has been warped and deformed.

Figure 4:
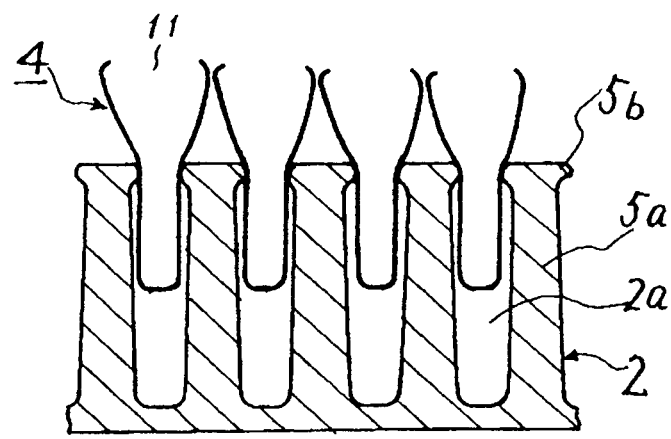
FIG. 4 is a partial sectional view showing a fitting relation between the insulator and a slot in the stator of an electric rotating machine according to Embodiment 1 of the invention.

FIG. 4 is a partial sectional view showing a fitting relation between the insulator and a slot in the stator of an electric rotating machine according to Embodiment 1 of the invention.

Figure 5:
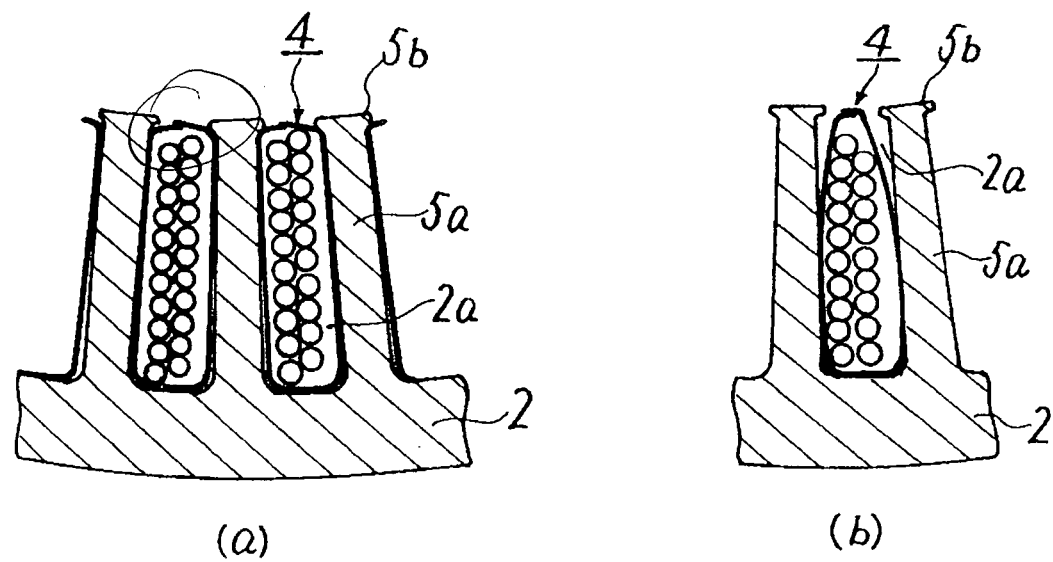
FIGS. 5(*a*) and (*b*) are partial sectional views each showing a condition that insertion of a winding assembly has been completed in the stator of an electric rotating machine according to Embodiment 1 of the invention.

FIGS. 5(a) and (b) are partial sectional views each showing a condition that insertion of a winding assembly has been completed in the stator of an electric rotating machine according to Embodiment 1 of the invention.

In FIGS. 1 to 7, the same reference numerals are designated to the same or like parts as in the foregoing conventional device described with reference to FIGS. 10 to 17.

First now referring to FIG. 1, a stator 8 acting as an armature includes a stator core 2 acting as an armature core, in which plural slots 2a each extending in vertical axial direction are provided in circumferential direction, a stator winding 3 acting as an armature winding and inserted in the mentioned slots and wound round the mentioned stator core 2, and insulator 4 fitted in the mentioned slots 2a to electrically insulate the mentioned stator core 2 and stator winding 3 respectively.

This stator 8 is manufactured in the same process as described in the foregoing prior art.

Figure 2:
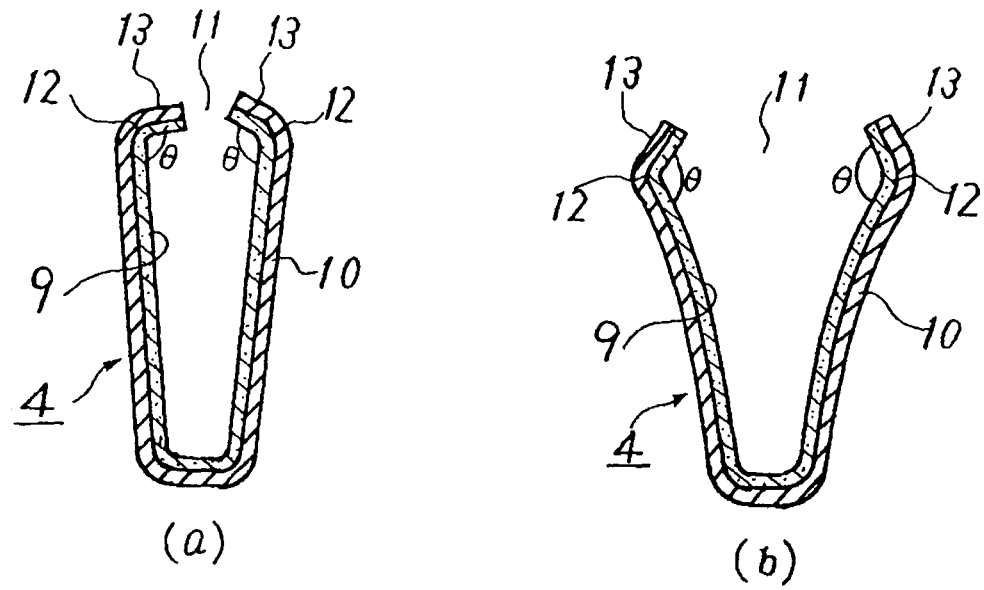
FIGS. 2(*a*) and (*b*) are sectional views each showing an insulator in the stator of an electric rotating machine according to Embodiment 1 of the invention, and in which (a) shows a configuration under the condition that the insulator has been formed, and (b) shows a configuration under the condition that the insulator has been warped and deformed.
Figure 3:
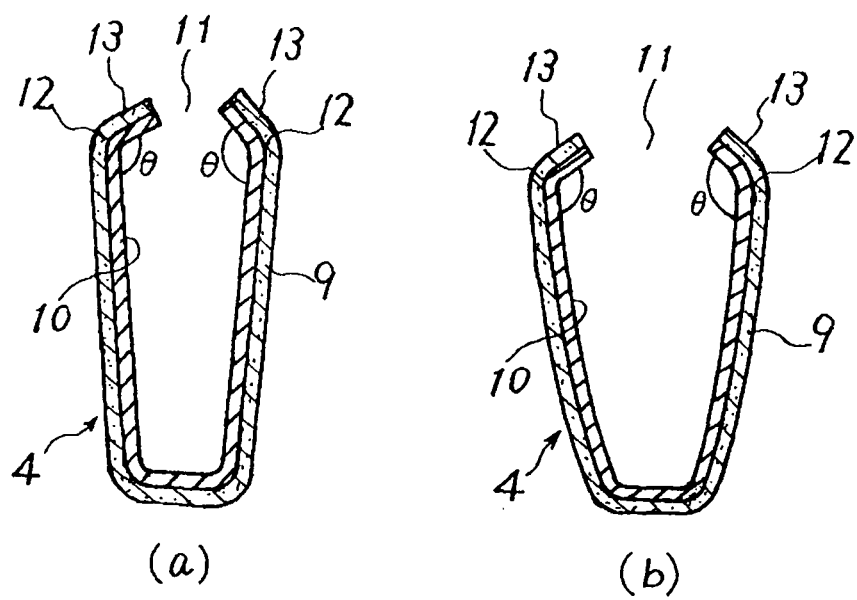
FIGS. 3(*a*) and (*b*) are sectional views each showing a modification of the insulator, and in which (a) shows a configuration under the condition that the insulator has been formed, and (b) shows a configuration under the condition that the insulator has been warped and deformed.

Structure of the mentioned insulator 4 is as shown in FIGS. 2 and 3.

The insulator 4 shown in FIG. 2(a) is formed into a substantially U-shaped two-layer structure in which a paper 9 is disposed on the inside, i.e., on the stator winding side, and a resin 10 is disposed on the outside, i.e., on the stator core side. Curvature portions 12 bending inward at different angles θ and flat edge portions 13 extending from these curvature portions facing to each other, and of which inclinations are different, are formed at both end edge portions of an opening portion 11. The bending angles θ for constituting the foregoing flat edge portions 13 are established so that one of the bending angles are different from the other by at least an angle corresponding to thickness of the two-layer structure of the insulator 4.

The paper 9 composing the foregoing insulator 4 is, for example, a Nomex sheet. After the insulator 4 is formed, the paper 9 absorbs water and expands, whereby the insulator 4 comes to be deformed.

The insulator 4 warps due to difference in expansion coefficient between the paper 9 and the resin 10, and widening curved surfaces gently expanding inwardly to the end as shown in FIG. 2(b) are automatically formed. In this manner, the opening portion 11 that assures stable insertion of the winding assembly is kept wide and open.

The insulator 4 shown in FIG. 3(a) is also formed into the same two-layer structure as FIG. 2(a), in which the paper 9 is disposed on the outside, i.e., on the stator core side, and the resin 10 on the inside, i.e., on the stator winding side.

Since this insulator 4 includes the paper 9 on the outside, when the paper 9 absorbs water and expands, gently widening curved surfaces whose central portions expand outward as shown in FIG. 3(b) are formed, and the opening portion 11 keeps the required configuration.

In this embodiment, the insulator is composed of paper on the iron core side and resin on the winding side. This not only prevents the core material of the iron core from damaging the insulator but also facilitates the insertion work because the resin portion is flexibly deformed along the configuration of the winding.

In this Embodiment 1, the foregoing insulator 4 is provided with their opening portion 11 kept wide open due to the gently widening curved surface. Then the insulator 4 is fitted into the slot 2a so that the opening portion 11 at the end protrudes out of the slot 2a as shown in FIG. 4. Subsequently, the winding assemblies 7A, 7B and 7C are inserted through the opening portions 11 of the foregoing insulator 4 so that the insulator 4 guides the winding assemblies 7A, 7B and 7C. This insertion into the slots 2a is carried out through the insulator 4 as shown in FIG. 5(a) and FIG. 5(b).

In the insertion process described above, the widening configuration of the insulator 4 is gradually narrowed between insides of the flange portions 5b of the tooth 5a of the stator core 2 as the insertion goes on. When the insulator has been completely inserted, end of one of the flat edge portions 13 of the insulator 4 is tightly in contact with the inner face of the other flat edge portion 13. Thus, the opening is closed and the winding assemblies 7A 7B, and 7C are completely surrounded. As a result, high insulation performance is secured. Furthermore, at the time of bending the laminated core, there is no possibility that the strands 6 protrude from the slots 2a, and efficiency in insertion work is improved.

Embodiment 2

Figure 6:
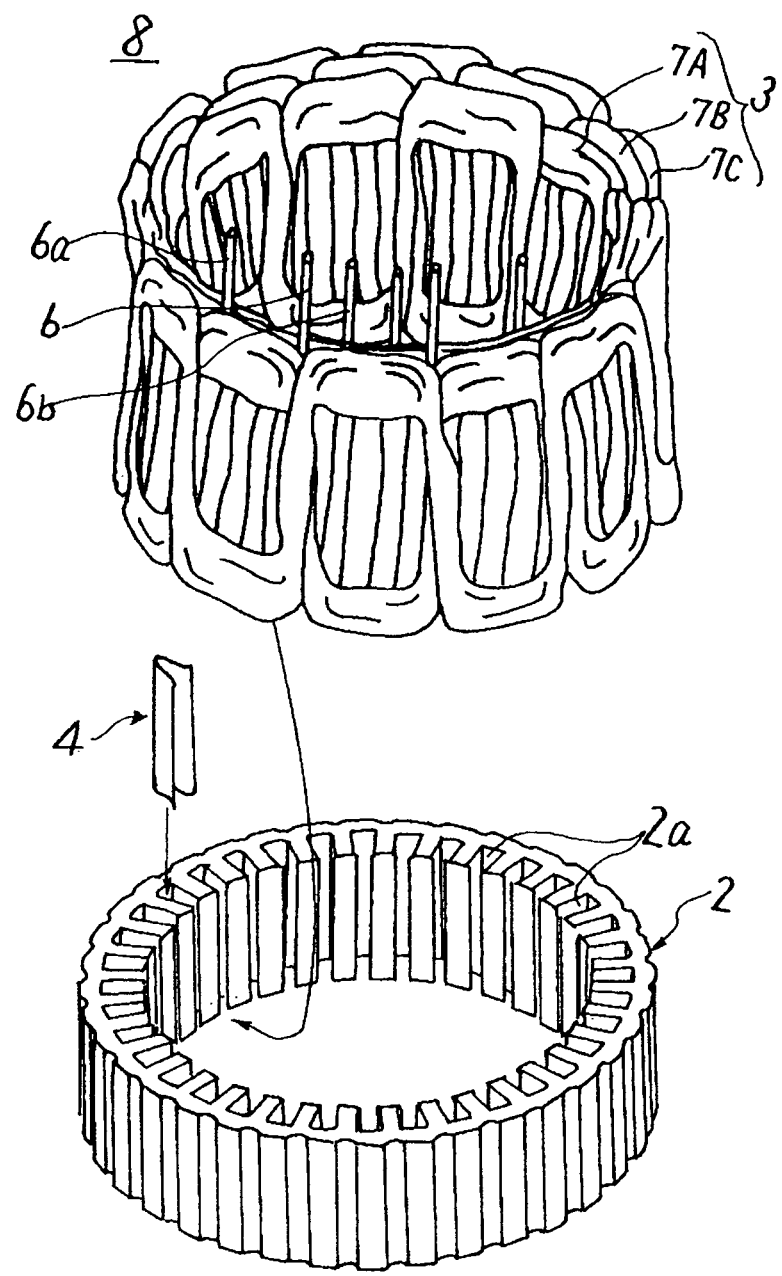
FIG. 6 is a perspective view showing a stator of an electric rotating machine according to Embodiment 2 of the invention.

FIG. 6 is a perspective view showing a stator of an electric rotating machine according to Embodiment 2 of the invention.

The stator 8 according to this Embodiment 2 is made by mounting the stator winding 3 formed into a cylindrical shape as a whole on the stator core 2 preliminarily formed into a cylindrical shape.

First, the cylindrical stator core 2 provided with a large number of slots 2a and the insulator 4 is prepared as described in the foregoing Embodiment 1. Next, one strand 6 is wound a predetermined turns in the form of wave winding at three slot pitch, thus a winding assembly 7A cylindrical as a whole is obtained. In the same manner, the winding assemblies 7B and 7C are prepared. These winding assemblies are arranged to overlap each other forming three layers staggering by one slot pitch between the winding assemblies, and the stator winding 3 acting as an armature winding is obtained.

Subsequently, the insulator 4 is fitted into the slots 2a of the stator core 2 in axial direction and is set so that the opening portion 11 at the end protrudes in radial direction. Then diameter of the stator winding 3 prepared in advance is narrowed for insertion in the stator core 2. Thereafter, the stator winding 3 is inserted into the slots 2a through the insulator 4, thus a stator being obtained.

In this Embodiment 2, the insulator 4 of the two-layer structure configured as shown in FIG. 2 or 3 is also employed. Previous to the insertion of the stator winding 3, the insulator 4 is fitted in the slot 2a so that the opening portion 11 of the insulator 4 protrudes inwardly out of the slot 2a in radial direction. Then the stator winding 3 is guided by the insulator 4 and inserted into the slot 2a. This Embodiment 2 provides the same functions and advantages as in the foregoing Embodiment 1.

Embodiment 3

Figure 7:
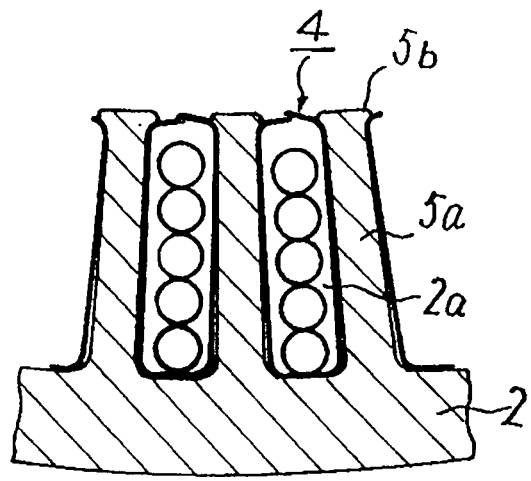
FIG. 7 is a partial sectional view showing a stator of an electric rotating machine according to Embodiment 3 of the invention.

FIG. 7 is a partial sectional view showing a stator of an electric rotating machine according to Embodiment 3 of the invention.

In this Embodiment 3, the functions and advantages achieved by application of the insulator 4 as well as the structure are the same as in the foregoing Embodiment 1 with the exception that the stator winding 3 is wound forming a row in depth direction. In this embodiment, the winding is disposed form a line, and the insulator and the slots are formed so as to cover all the coils, and therefore the stator has high insulation performance. As a result, sufficient insulation performance for a generator as well as high thermal conductivity (from the winding to the iron core) is achieved in this two-layer structure insulator.

Embodiment 4

Figure 8:
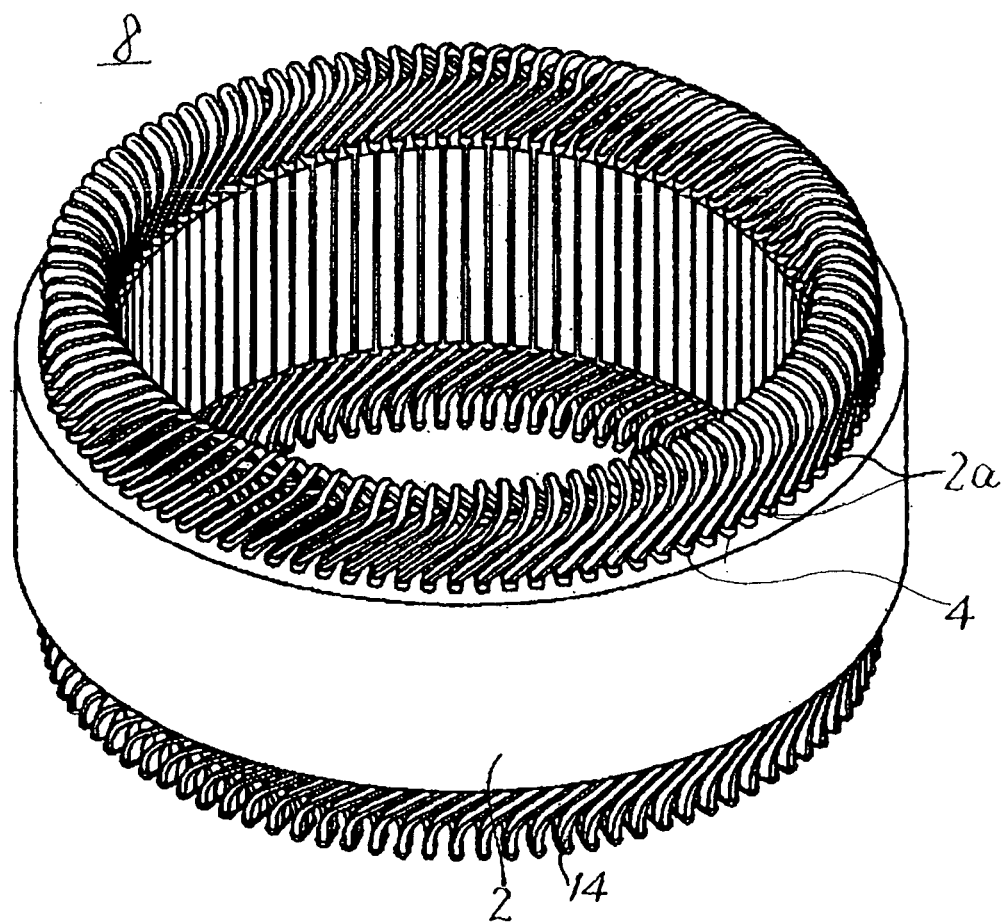
FIG. 8 is a perspective view showing a stator of an electric rotating machine according to Embodiment 4 of the invention.

FIG. 8 is a perspective view showing a stator of an electric rotating machine according to Embodiment 4 of the invention.

The stator 8 shown in this Embodiment 4 is comprised of the stator core 2 and a stator winding group in which plural conductor segments 14 of straight angular configuration in section are connected to and built in the stator core 2 and an output current flows. The insulator 4 carries out electrical insulation between each conductor segment 14 of the stator 8 and the inner wall face of the slot 2a of the stator core 2.

In this embodiment, the insulator is arranged so that the resin is disposed on the core side and the paper is on the winding side. The conductor segments of this embodiment are inserted into the slots in axial direction. It is certain that a large frictional force is applied to the insulator. But, since a slippery paper is employed on the winding side in this embodiment, the insulator does not get out of position, thus the conductor segments being inserted efficiently and easily.

Embodiment 5

Figure 9:
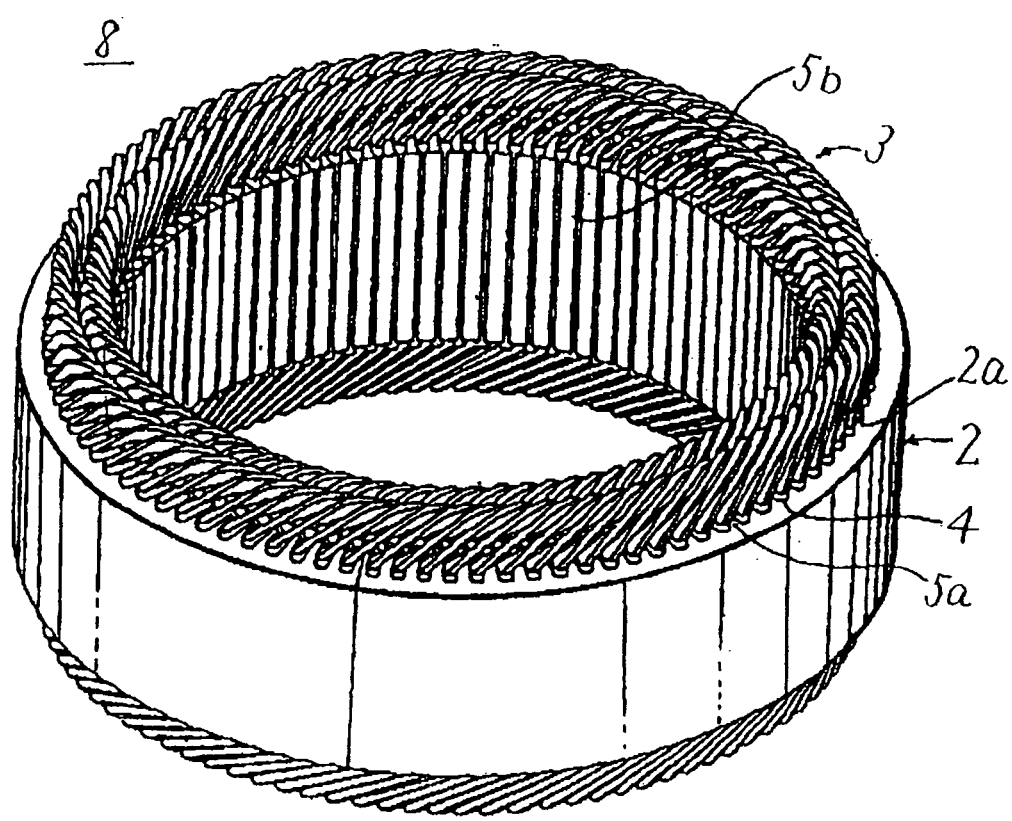
FIG. 9 is a perspective view showing a stator of an electric rotating machine according to Embodiment 5 of the invention.
Figure 10:
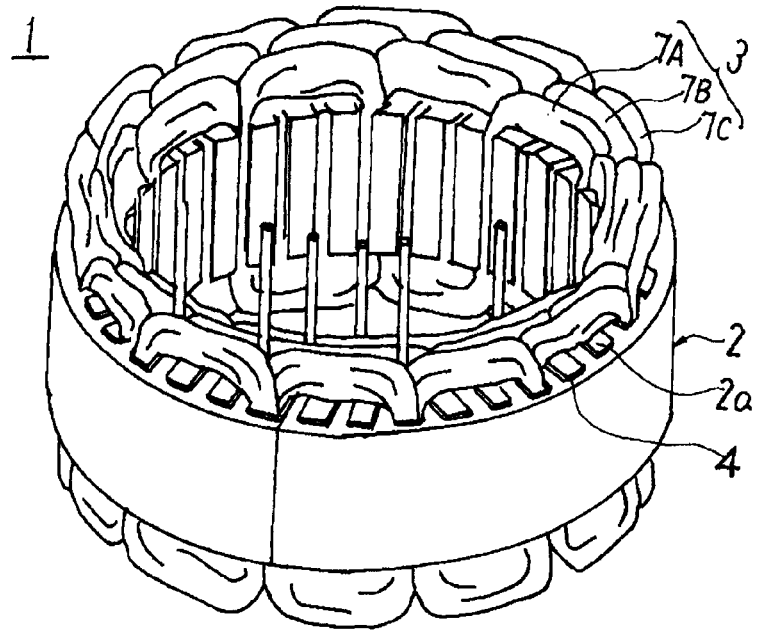
FIG. 10 is a perspective view showing a conventional stator of an electric rotating machine for vehicle.
Figure 11:
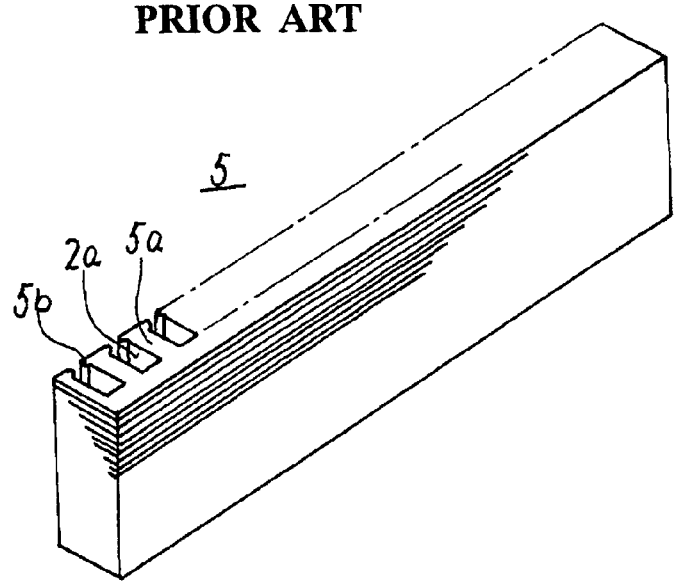
FIG. 11 is a perspective view showing a rectangular parallelepiped laminated core forming the stator.
Figure 12:
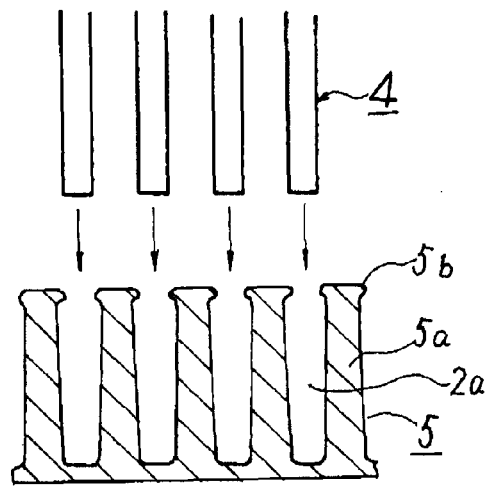
FIG. 12 is a partially sectional view to explain how the insulator is inserted in the conventional stator of an electric rotating machine for vehicle.
Figure 13:
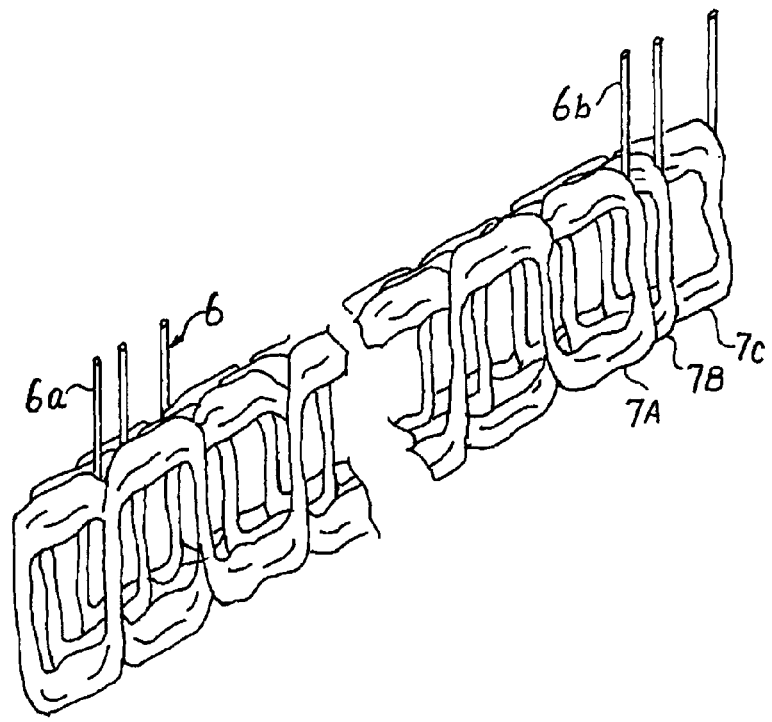
FIG. 13 is a perspective view showing a condition of the stator before winding the stator winding.
Figure 14:
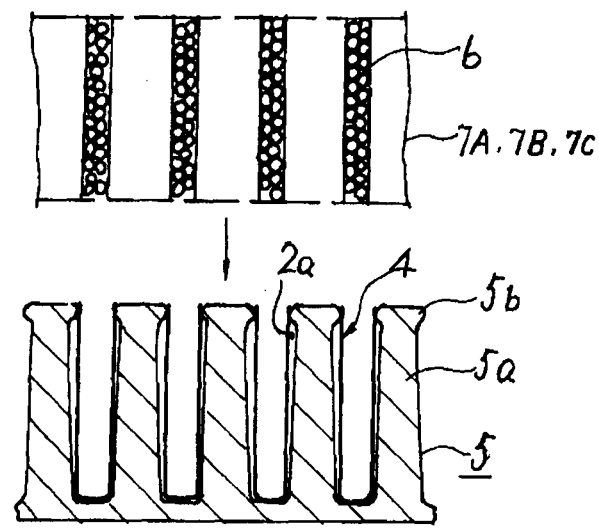
FIG. 14 is a partial sectional view to explain how the winding is inserted in the conventional stator of an electric rotating machine for vehicle.
Figure 15:
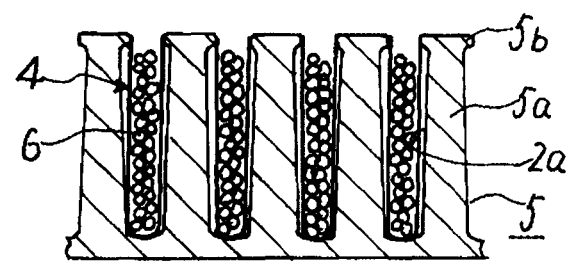
FIG. 15 is a partial sectional view showing a structure under the condition that the winding has been inserted in the conventional stator of an electric rotating machine for a vehicle.
Figure 16:
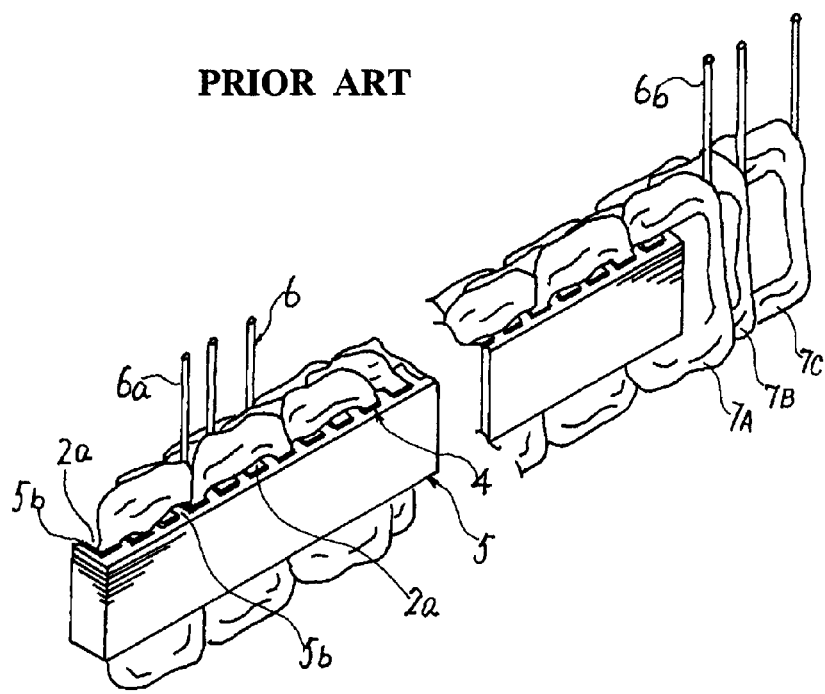
FIG. 16 is a perspective view showing a condition that the winding is inserted in the conventional stator of an electric rotating machine for vehicle.
Figure 17:
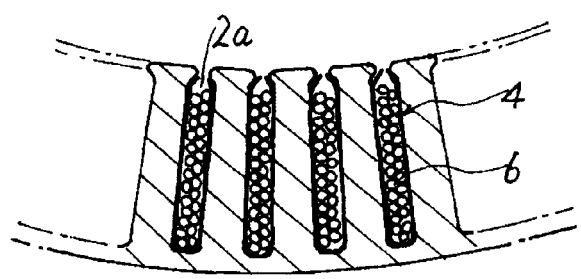
FIG. 17 is a partially sectional view to explain bending function of the laminated core of the conventional stator of an electric rotating machine for vehicle.

FIG. 9 is a perspective view showing a stator of an electric rotating machine according to Embodiment 5 of the invention.

The stator 8 shown in this Embodiment 5 includes a cylindrical stator core 2 acting as an armature core, in which plural slots 2a each extending in vertical axial direction are provided in circumferential direction, a stator winding 3 acting as an armature winding wound round the foregoing stator core in the form of a regular winding continuous wire, and the insulator 4 fitted in the foregoing slot 2a to electrically insulate the stator winding 3 and the stator core 2.

Previous to the insertion of the stator winding 3, the insulator 4 is fitted in the slot 2a so that the opening portion 11 of the insulator 4 protrudes inwardly out of the slot 2a in radial direction. Then the stator winding 3 is guided by the insulator 4 and inserted into the slot 2a. This Embodiment 2 provides the same functions and advantages as in the foregoing Embodiment 1.

What is claimed is:

1. A method of forming a stator of an electric rotating machine, the method comprising:
providing a stator core having a plurality of teeth defining a plurality of slots in a circumferential direction;
providing a plurality of insulators having a U-shape and a two-layer structure composed of a paper layer and a resin layer, each of the insulators including end portions which bend inward at different angles;
partially inserting the insulators in the slots so that at least the end portions of the insulators remain outside of the slots, wherein sides of each of the insulators have a convex shape or a concave shape prior to being partially inserted in the slots; and
inserting a stator winding in an opening portion of the insulators so that the insulators and the stator winding are fully inserted in the slots and the end portions of the insulators overlap to completely close the opening portion of the insulators.

2. The method according to claim 1, wherein the sides of each of the insulators have the convex shape prior to being inserted in the slots, and the paper layer is an inner layer contacting the stator winding, and the resin layer is an outer layer contacting the teeth of the stator.

3. The method according to claim 2, wherein the convex shape results from a difference in expansion coefficient between the paper layer and the resin layer.

4. The method according to claim 1, wherein the sides of each of the insulators have the concave shape prior to being inserted in the slots, and the resin layer is an inner layer contacting the stator winding, and the paper layer is an outer layer contacting the teeth of the stator.

5. The method according to claim 4, wherein the concave shape results from a difference in expansion coefficient between the paper layer and the resin layer.

6. The method according to claim 1, wherein the angles at which the end portions bend inward are different from each other by at least an amount corresponding to a thickness of the insulators.

* * * * *